US012180045B2

(12) United States Patent
Cowell et al.

(10) Patent No.: US 12,180,045 B2
(45) Date of Patent: Dec. 31, 2024

(54) PULLEY

(71) Applicant: TREEMAGINEERS LTD, Pitlochry Perth and Kinross (GB)

(72) Inventors: Christopher Cowell, Pitlochry Perth and Kinross (GB); Elliot Tanner, Montgomery Powys (GB)

(73) Assignee: TREEMAGINEERS LTD, Pitlochry (GB)

( * ) Notice: Subject to any disclaimer, the term of this patent is extended or adjusted under 35 U.S.C. 154(b) by 195 days.

(21) Appl. No.: 17/772,915

(22) PCT Filed: Oct. 28, 2020

(86) PCT No.: PCT/GB2020/052719
§ 371 (c)(1),
(2) Date: Apr. 28, 2022

(87) PCT Pub. No.: WO2021/084243
PCT Pub. Date: May 6, 2021

(65) Prior Publication Data
US 2022/0396456 A1 Dec. 15, 2022

(30) Foreign Application Priority Data
Oct. 30, 2019 (GB) ..................................... 1915752

(51) Int. Cl.
*B66D 3/04* (2006.01)

(52) U.S. Cl.
CPC ........ *B66D 3/046* (2013.01); *B66D 2700/028* (2013.01)

(58) Field of Classification Search
CPC . B66D 3/046; B66D 3/04; B66D 3/06; B66D 3/08; B66D 3/10; B66D 2700/026; B66D 2700/028
See application file for complete search history.

(56) References Cited

U.S. PATENT DOCUMENTS

| | | | |
|---|---|---|---|
| 973,177 | A | 10/1910 | Davis et al. |
| 1,732,084 | A | 10/1929 | Dalton |

(Continued)

FOREIGN PATENT DOCUMENTS

| | | |
|---|---|---|
| CN | 106185676 | 8/2018 |
| EP | 3 159 052 | 4/2017 |
| EP | 3 552 675 | 10/2019 |

OTHER PUBLICATIONS

International Search Report and Written Opinion of the International Searching Authority mailed Feb. 2, 2021, in connection with corresponding international Application No. PCT/GB2020/052719, 11 pp.

*Primary Examiner* — Sang K Kim
*Assistant Examiner* — Nathaniel L Adams
(74) *Attorney, Agent, or Firm* — NIXON & VANDERHYE

(57) ABSTRACT

A pulley block is disclosed. The pulley block comprises: first and second plates and a pulley sheave disposed between the plates for rotation on bearings upon a sheave axle that extends between the plates along a sheave axis. The plates are connected to the sheave axle so as to permit rotation of one plate with respect to the other about the sheave axis between a closed position of the pulley block and an open position of the pulley block. Each plate has, at a position remote from the sheave axis, a respective bollard formation, which bollard formations are disposed such that, when the plates are in the closed position, the respective bollard formations are in contact with or in close proximity to one another to form a bollard that extends between the plates. When the plates are in the open position, the respective bollard formations are spaced apart. The pulley sheave rotates on bearings upon a sheave axle assembly that extends between the plates along a sheave axis. Which assembly has a main axle that is fixed for rotation with respect to the first (Continued)

plate and free for rotation with respect to the second plate and an axle cap that clamps the main axle to the first plate, the axle cap being removably secured to the main axle.

25 Claims, 11 Drawing Sheets

(56) References Cited

U.S. PATENT DOCUMENTS

| | | | | |
|---|---|---|---|---|
| 2,162,080 | A | 6/1939 | Hacker | |
| 2,555,059 | A | 5/1951 | Schrader | |
| 2,649,282 | A * | 8/1953 | Fate, Jr. | B66D 3/046 254/406 |
| 2,762,607 | A | 9/1956 | Anderson | |
| 6,244,570 | B1 * | 6/2001 | Habberstad | B66D 3/06 254/416 |
| 9,975,744 | B2 * | 5/2018 | Groves | B66D 3/04 |
| 10,995,842 | B1 * | 5/2021 | Siemer, Jr. | F16H 55/52 |
| 2022/0274812 | A1 * | 9/2022 | Cowell | B66D 3/04 |

* cited by examiner

PULLEY

This application is the U.S. national phase of International Application No. PCT/GB2020/052719 filed Oct. 28, 2020, which designated the U.S. and claims priority to GB 1915752.8 filed Oct. 30, 2019, the entire contents of each of which are hereby incorporated by reference.

The present invention relates to pulley blocks. It has particular, but not exclusive, application to impact block pulleys, but could also be applied to many other types of rope-directing product.

Pulley blocks find multiple applications in many different types of rope rigging, including, but not limited to, applications in the fields of climbing, rope access, rescue, industrial height safety, marine, heavy lifting and slacklining, in sport, industrial and tactical sectors. There are several terms synonymous with "pulley block", including "impact block", "impact pulley", "roller", "redirect", "hauling block", "hauling pulley", "lifting block", "arborist block", "tailboard block", "marine block", "lifting pulley" or, simply, "pulley", amongst others.

As with all items of equipment used in rope rigging, there are demands from users for a pulley block that is strong and is also low mass. These demands are in some respects competing, since the pursuit of one is typically to the detriment of the other. Design of pulley blocks has the additional challenge of maintaining an efficient rope configuration as a moving line is redirected on a rotating pulley sheave.

An aim of this invention is to provide pulleys that are an improvement over known pulleys when these design objectives are taken into consideration.

The principal components of a pulley block are first and second spaced-apart plated, between which a sheave is carried for rotation about an axis that is generally normal to the plates. While in use, the plates are interconnected by a fixed bollard that is spaced away from the sheave, the bollard typically having a cross-section that is circular about an axis that is parallel to the axis of rotation of the sheave (or, at least, being convex insofar as it faces the sheave), this shape being suitable to allow a line to slide smoothly over the bollard. Typically, the bollard can be unlocked whereby the plates can rotate with respect to one another about the sheave axis.

From a first aspect, this invention provides a pulley block comprising:

a. first and second plates;
b. a pulley sheave disposed between the plates for rotation on bearings upon a sheave axle that extends between the plates along a sheave axis,
c. the plates being connected to the sheave axle so as to permit rotation of one plate with respect to the other about the sheave axis between a closed position of the pulley block and an open position of the pulley block, and
d. each plate having, at a position remote from the sheave axis, a respective bollard formation, which bollard formations are disposed such that, when the plates are in the closed position, the respective bollard formations are in contact with or in close proximity to one another to form a bollard that extends between the plates, and when the plates are in the open position, the respective bollard formations are spaced apart.

Thus, the bollard is formed from a formation of the two plates, rather than from separate components attached to one or both plate. This can result in a saving of mass, simplified manufacturing processes and greater strength than is the case with known pulley blocks. It also increases safety because, compared with a conventional pulley block, there are fewer components to fail. Once configured and loaded correctly, the loading pattern urges the pulley block to the closed position.

In the open position, a rope, attachment sling or other line can be installed into the pulley block. Upon subsequent movement of the pulley block to the closed position, the line is constrained to move between the bollard and the sheave.

Typically, each bollard formation is formed integrally with a respective plate, for example as a one-piece cast and/or forged component.

Preferably, a respective bore extends through each of the bollard formations (or through one and part-way through the other), the bores being aligned with one another on a bollard axis when the pulley block is in the closed position. In such embodiments, the pulley block can be secured in the closed position by insertion of a locking component into the bores, thereby maintaining the bores in alignment with one another.

The bollard formations are preferably shaped such that, in the closed position, part of one bollard formation overlaps and is in contact with part of the other bollard formation in a direction that has a component parallel to the bollard axis. Preferably, the overlapping parts of the bollard formations have surfaces in contact with one another that are normal to the bollard axis. This has the effect of interlocking the bollard formations and resisting separation of them should the plates become loaded with a lateral force (in a direction that would tend to separate the plates), so contributing to the strength and safety of the pulley block.

In which in the closed position, it is preferable that the bollard formations together form a bollard that is convex in section in a direction facing towards the sheave. For example, in the closed position, the bollard formations may together form a bollard that is circular in section, but other smooth cross-sections may provide a suitably low-friction surface.

From a second aspect, this invention provides a pulley block comprising:

a. first and second plates;
b. a pulley sheave disposed between the plates for rotation on bearings upon a sheave axle assembly that extends between the plates along a sheave axis,
c. the plates being connected to the sheave axle assembly so as to permit rotation of one plate with respect to the other about the sheave axis between a closed position of the pulley block and an open position of the pulley block, and
d. the sheave axle assembly including:
    i. a main axle that is fixed for rotation with respect to the first plate and free for rotation with respect to the second plate; and
    ii. an axle cap that clamps the main axle to the first plate, the axle cap being removably secured to the main axle.

Such an arrangement allows an end-user or service personnel to dismantle the axle assembly, for example, to conduct maintenance.

Typically, the axle cap is in threaded engagement with the main axle.

Each of the axle cap and the main axle each include a shaft portion that extends through a respective through-hole in the first and second plates. Each of the axle cap and the main axle may include a head portion that is adjacent to a surface of the first and the second plate respectively adjacent to the through-holes.

The axle assembly includes a spacer that causes the head portion of the main axle to be spaced from the second plate in a direction parallel to the sheave axis. This prevents the second plate being clamped to the axle assembly, which would result in its rotational movement being restricted.

In typical embodiments, the axle cap is in threaded engagement with the main axle.

Embodiments may further include a securing mechanism that prevents rotation of the axle cap with respect to the first plate. Such a securing mechanism is preferably removable to allow the axle cap to be disconnected from the main axle to enable dismantling of the axle assembly.

Embodiments of the second aspect of the invention may include features that are present in embodiments of the first aspect of the invention.

Preferably, each plate has a recess within which a portion of the sheave extends. This can ensure that there is minimal clearance between the sheave and the plates and provide a smooth passage for a line where it comes into contact with or leaves the sheave. Typically, the recess is circular and centred on the sheave axis.

The axle assembly is preferably hollow to provide a passage through the pulley block in a direction parallel to the sheave axis. Advantageously, end portions of the passage are convex in section to provide a smooth entry and exit for a line, webbing or other load-bearing component entering and leaving the passage.

Embodiments of the invention may include two or more sheaves between the plates and may include more than two plates.

Most typically, the sheave is free for rotation in either direction, but might alternatively be restricted to rotation in a single direction.

Embodiments of the invention will now be described in detail, by way of example, and with reference to the accompanying drawings, in which.

Figure 1:
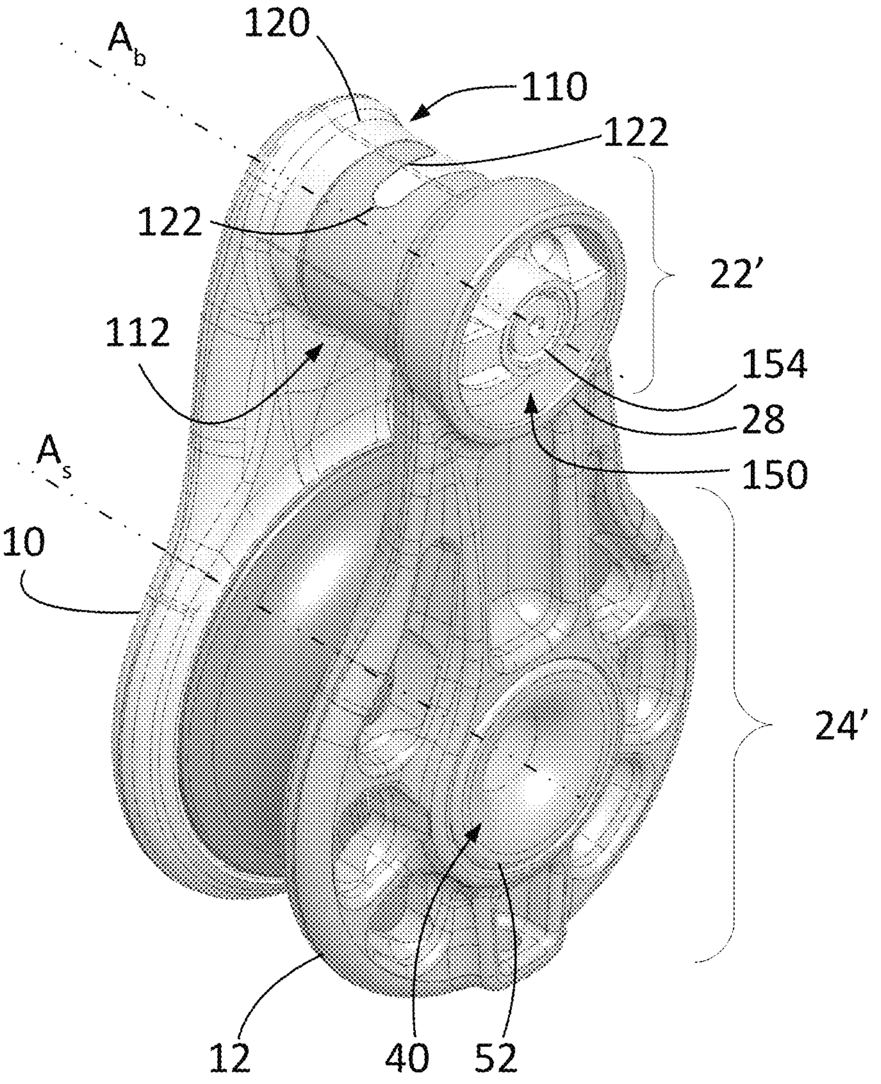
FIGS. 1 and 2 are orthographic views of a pulley embodying the invention in a closed condition.
Figure 2:
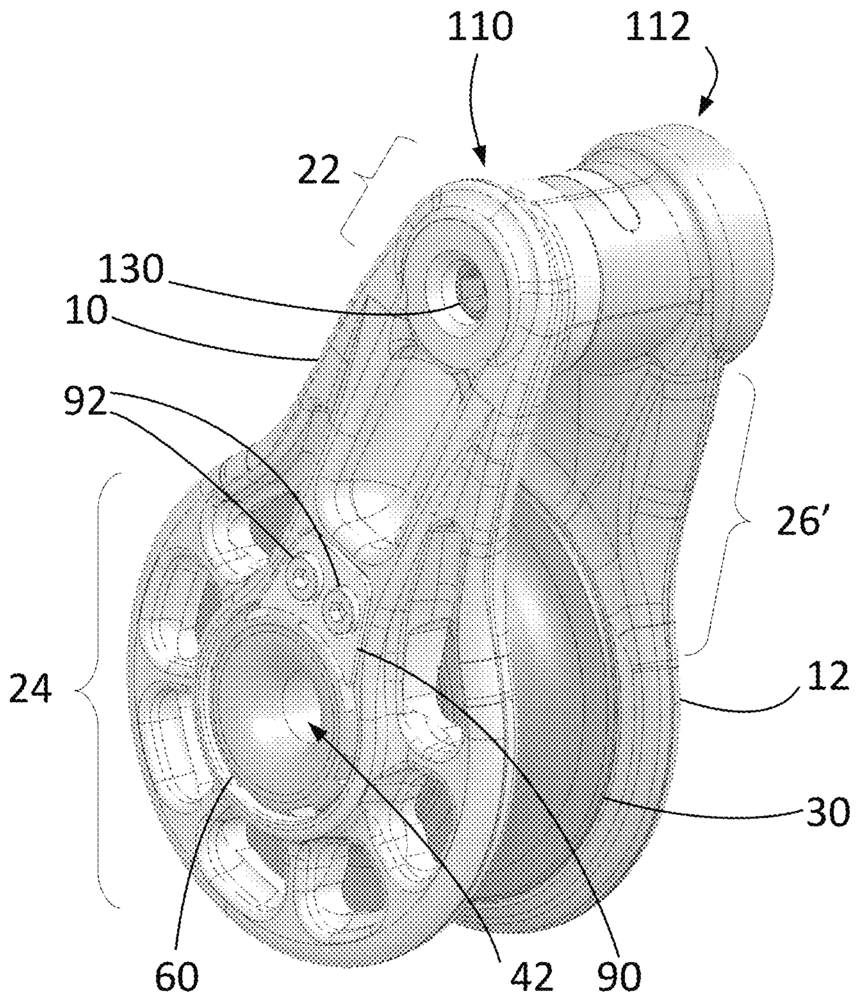
Figure 10A:
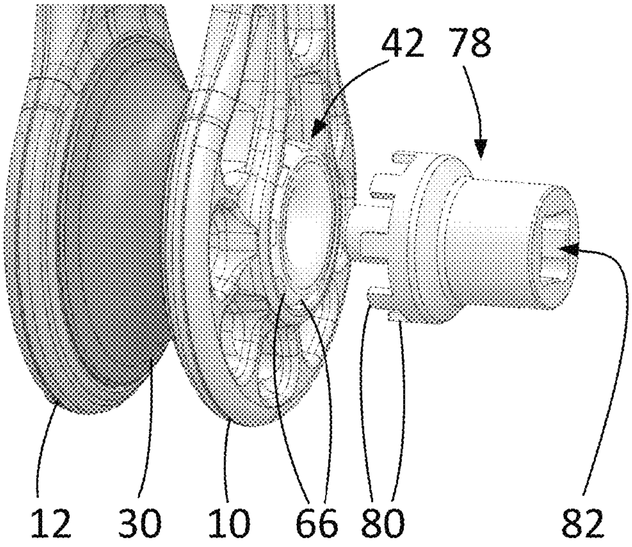
Figure 10B:
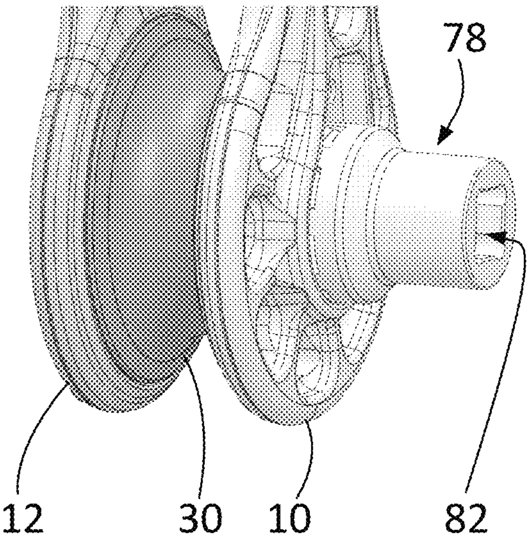
Figure 11:
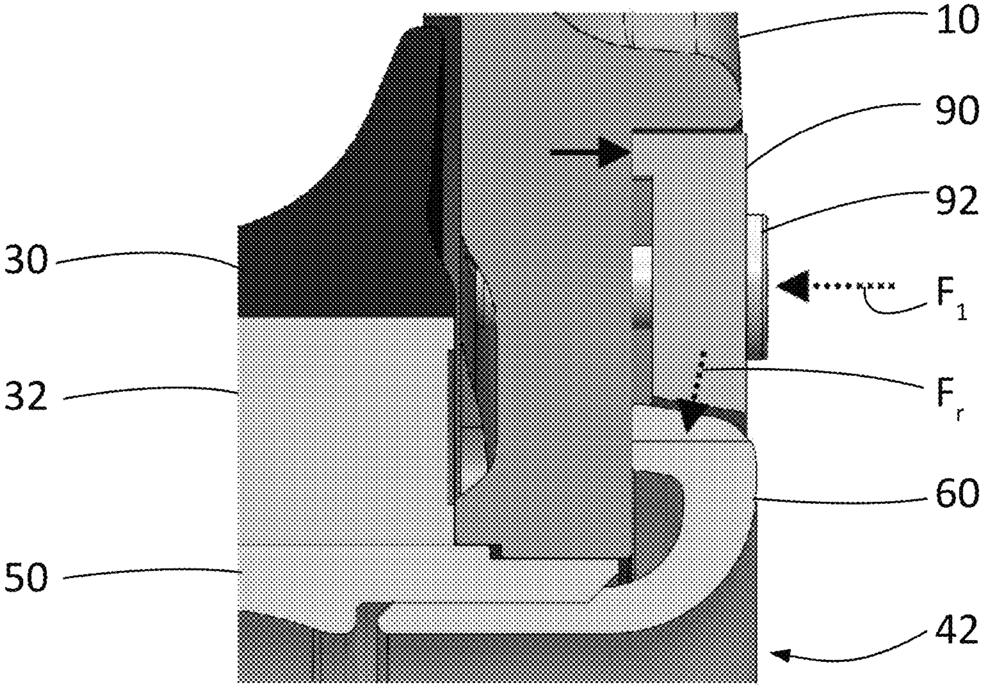
Figure 12:
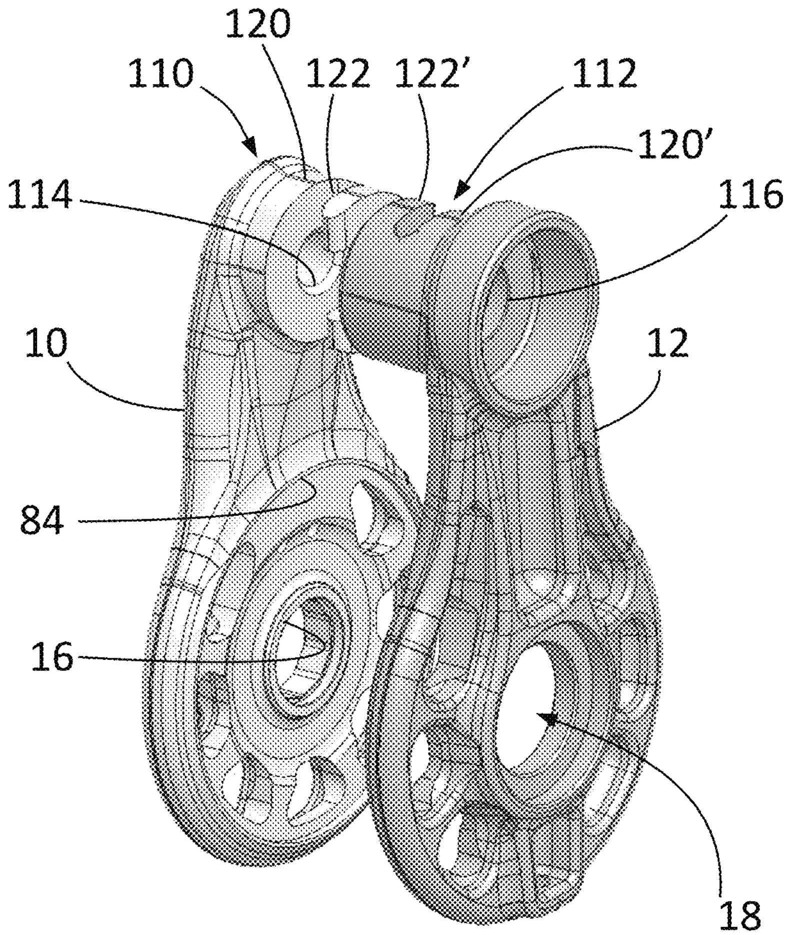
Figure 13:
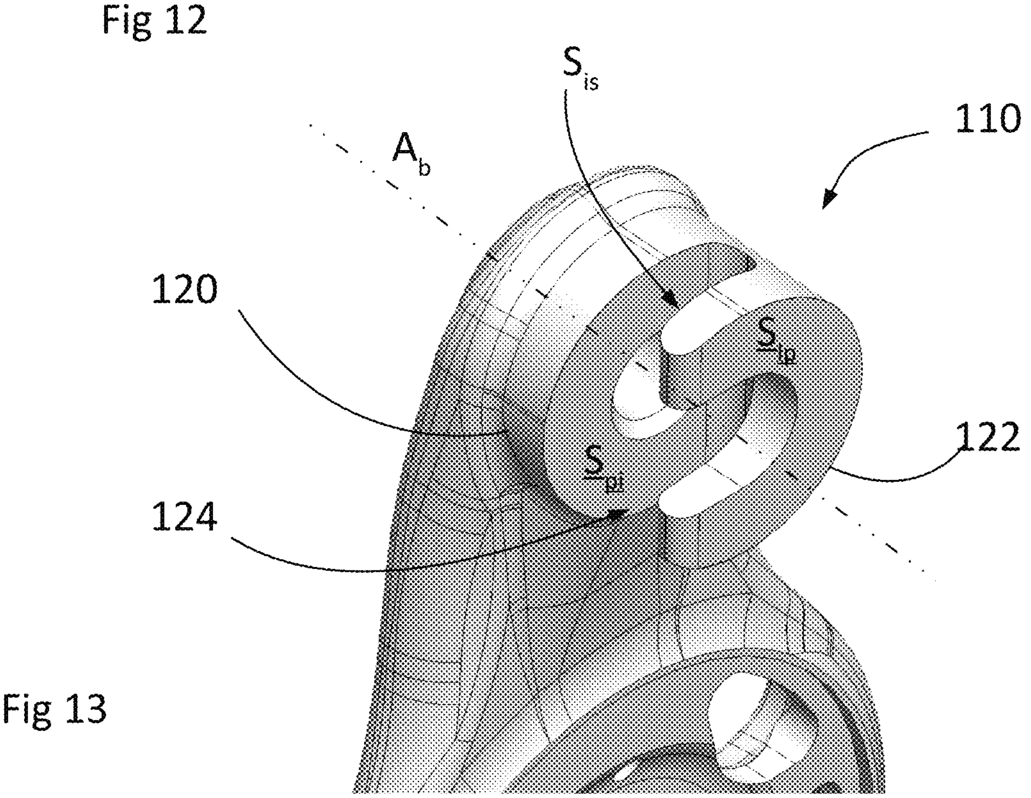
Figure 14:
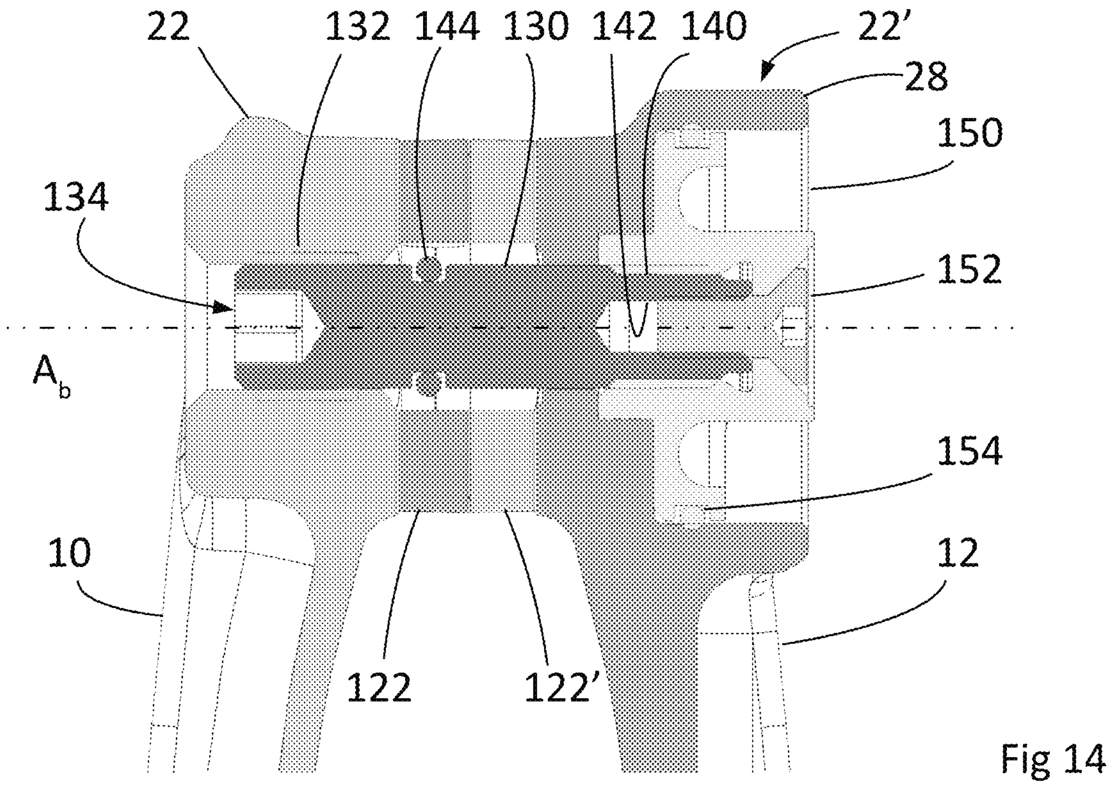
Figure 15:
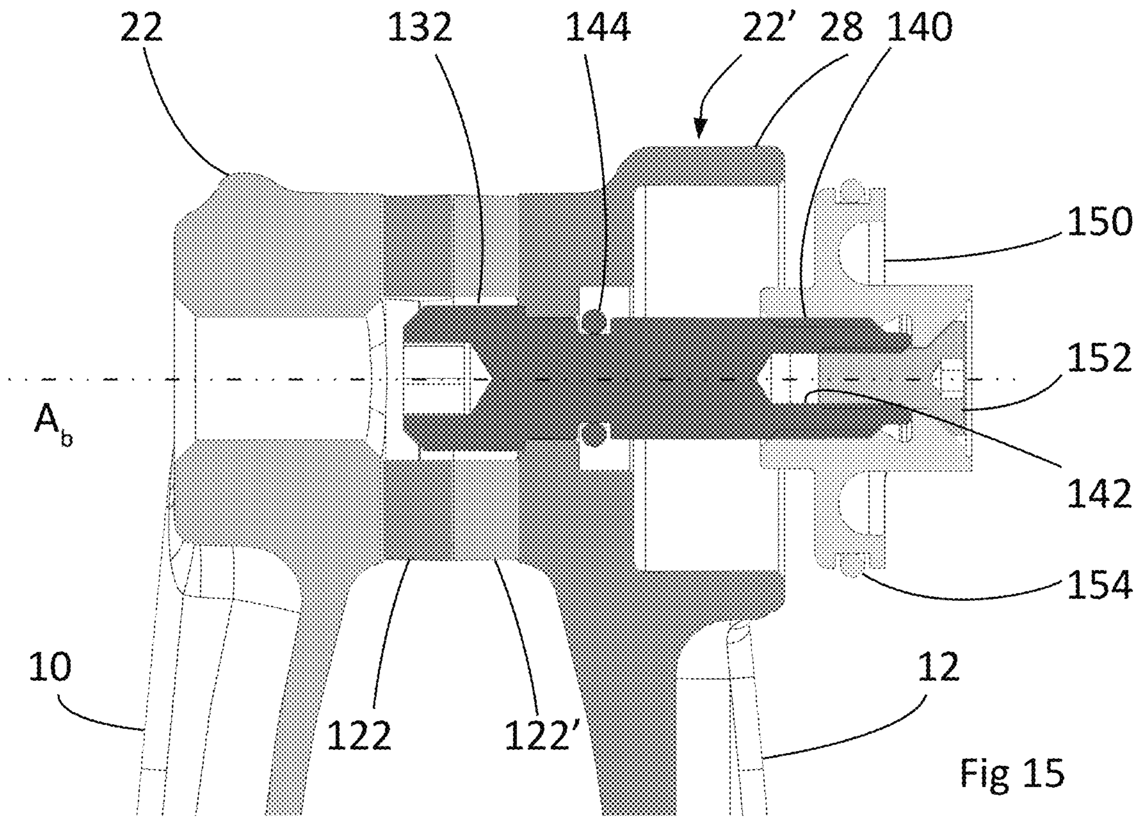
Figure 16:
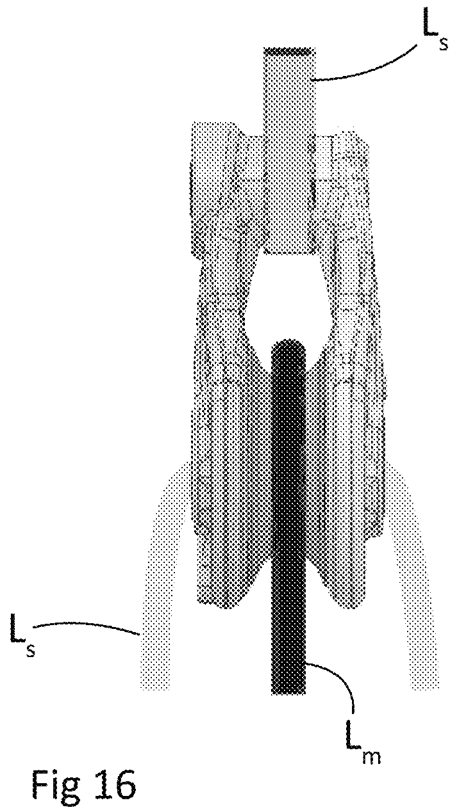
Figure 17:
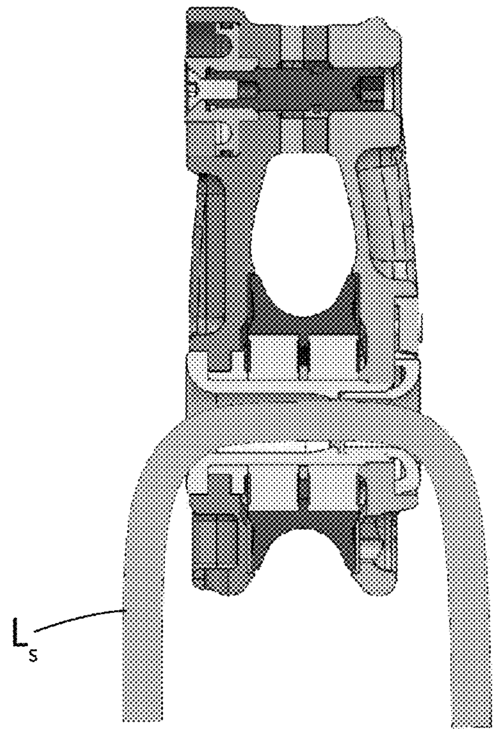
Figure 18:
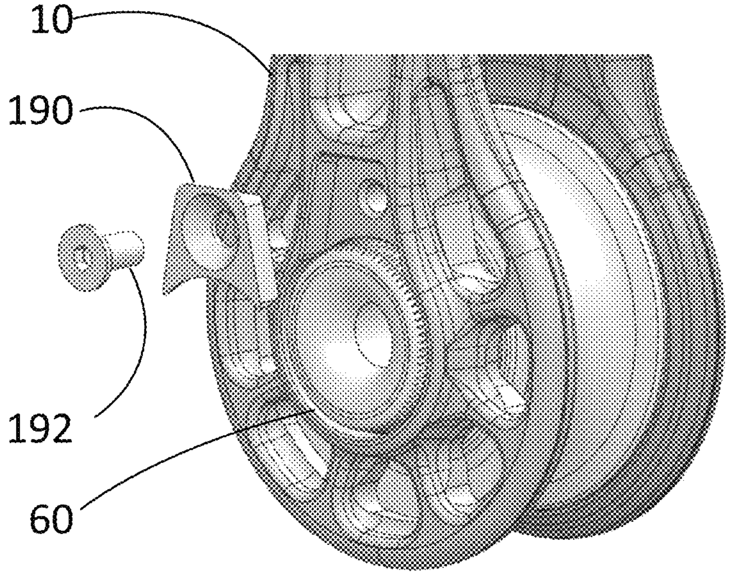
Figure 19:
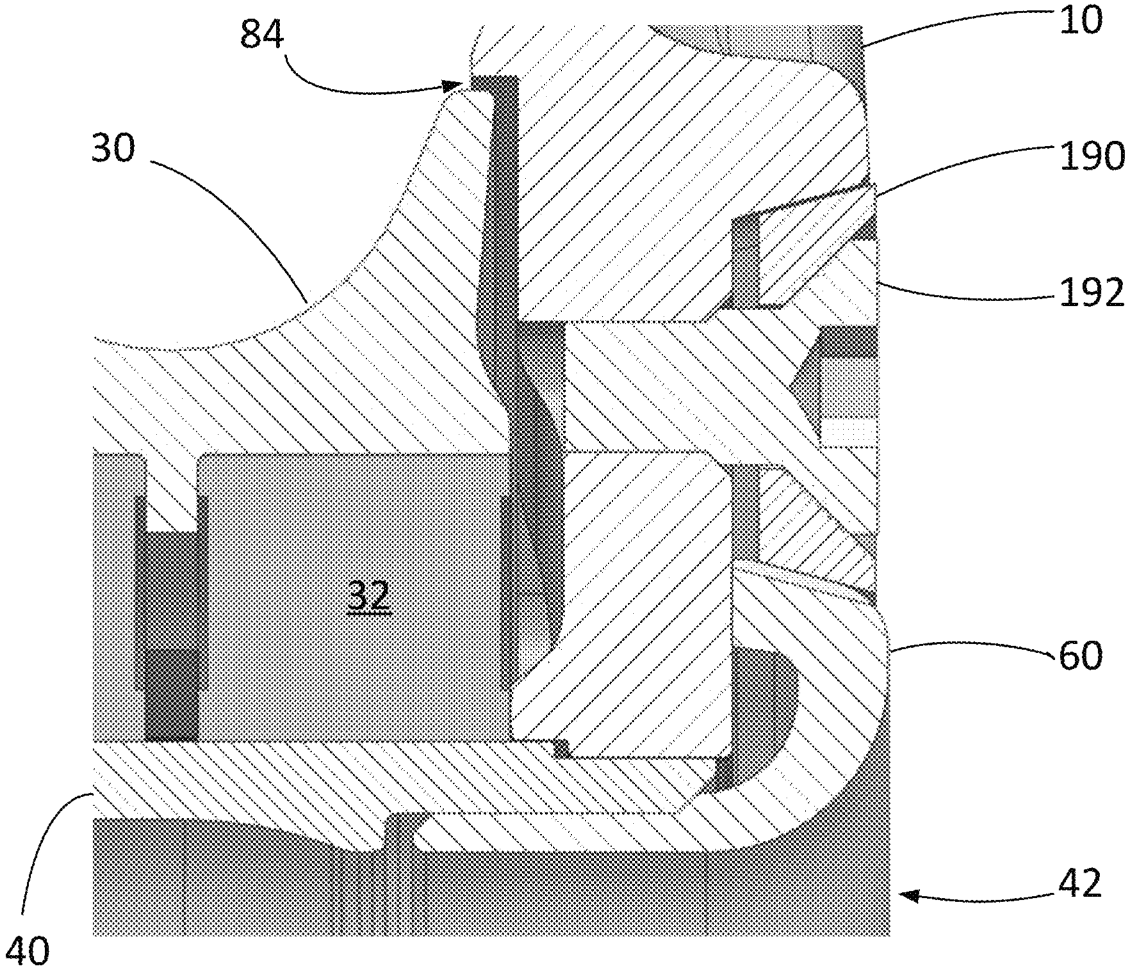

FIGS. 10*a* and 10*b* show use of a tool to secure an axle cap onto a main axle;

FIG. 11 shows a locking mechanism for preventing removal of an axle cap;

FIG. 12 is an exploded view of plates of the embodiment of FIG. 1;

FIG. 13 is a detail of a bollard formation of a first plate of the embodiment of FIG. 1;

FIGS. 14 and 15 show in detail a locking assembly of the embodiment of FIG. 1 in a locked and an unlocked condition;

FIGS. 16 and 17 show the embodiment of FIG. 1 in use with stationary and moving ropes;

FIG. 18 shows components of an embodiment of the invention that is a variation of the embodiment of FIGS. 1 to 17; and FIG. 19 is a partial section through the embodiment of FIG. 18.

With reference to the drawings, a pulley embodying the invention has first and second plates 10, 12. The plates 10, 12 have peripheral shapes that are broadly similar: they are formed from two arcuate portions, a first of larger radius centred on a sheave axis $A_s$ and a second of smaller radius centred on a bollard axis $A_b$. Thus, each plate 10, 12 has a small boss portion 22, 22' and a large boss portion 24, 24' interconnected by a shaft portion 26. The plates are disposed to opposite sides of a median plane $P_m$. The small boss portions 22, 22' of the first and second plates 10, 12 are each centred on a through-hole on the bollard axis $A_b$, that of the first plate 10 being internally threaded and that of the second plate 12 being plain. A cylindrical wall 28 surrounds the through hole of the small boss portion 22' of the second plate 12.

A sheave 30 is disposed between the plates 10, 12. The sheave 30 is carried on rolling-element bearings 32, 34 which allow it to rotate freely about the sheave axis $A_s$, which is centred upon the through-bores of the large boss portions 24, 24'. The bearings 32, 34 are carried on a sheave axle assembly that includes a main axle 40, an axle cap 42 and an axle spacer 44. The sheave 30 has an outer working surface 36 of concave cross-section and a cylindrical inner passage of diameter suitable for mounting upon the outer races of the bearings 32, 34. A rib 38 projects radially inwardly into the cylindrical inner passage mid-way along its length.

The main axle 40 is a tubular component that has a hollow shaft portion 50 which has a cylindrical outer surface upon which inner races of the bearings 32, 34 are supported. At a first end. The main axle 40 has a head 52 that is of larger diameter than the shaft portion 50, the head having a curved inner surface that provides a smooth, flared entry to the interior of the shaft portion 50. An end portion 54 of the main axle 40 opposite the head 52 has a polygonal external profile with multiple (in this embodiment, 10) flat facets. Internally, from the faceted end portion 54, the main axle 40 is internally threaded.

The axle cap 42 has a hollow, externally-threaded shaft 58 and a head 60 centred on the shaft 58. The thread of the shaft 58 is suitable for interconnection with the thread of the main axle 40. The head 60 has a curved inner surface that provides a smooth, flared entry to the interior of the threaded shaft 58. The head 60 of the axle cap 42 has several axially extending drive slots 66 spaced around its periphery.

The spacer 44 is shaped as a short cylinder with a radially-projecting flange 62 close to one of its ends. A passage 64 extends axially through the spacer, the passage 64 being dimensioned such that the spacer 44 is a close, sliding fit on the shaft portion 50 of the main axle 40.

The first plate 10 has a through hole 16 that is centred on the sheave axis $A_s$ and extends between outer and inner surfaces of the first plate 10. The through hole 16 of the first plate 10 is polygonal in peripheral shape and dimensioned such that the polygonal end portion 54 of the main axle 40 is a close fit within it Thus, the polygonal end portion 54 of the main axle 40 can be received within the through hole 16 of the first plate 10, it is prevented form rotating about its axis. It will be understood that the specific shape of the through hole 16 of the first plate 10 end portion 54 of the main axle 40 is not limited to being polygonal. The requirement is that the end portion 54 of the main axle 40 is constrained against rotation when it is received within the through hole 16 of the first plate 10. For example, they could alternatively have a flat section, be square or splined.

The second plate 12 has a through hole 18 that is centred on the sheave axis and extends between outer and inner surfaces of the second plate 12. The through hole 18 of the second plate 12 is of circular cross-section, and is of stepped diameter, such that a rib 70 of rectangular cross-section projects radially into it. The internal diameter of the through hole 18 of the second plate 12 in the region of the rib 70 is greater than the external diameter of the part of the spacer 44 adjacent to the flange 62 by an amount that allows the spacer to be inserted into the through hole 18 of the second plate 12 and to rotate with respect to the second plate 12 with a minimum of lateral movement. The rib 70 makes contact with the flange 62 to limit axial movement of the spacer within the through hole 18 of the second plate 12. The diameter of the through hole 18 of the second plate 12 between the rib 70 and the outer surface of the plate 12 is greater than the diameter of the head of the main axle 40, such that the head 52 is a close fit within the through hole.

The axle assembly is built up by passing the shaft portion 50 of the main axle 40 past the outer surface of the second plate 12 into the through hole 18 of the second plate 12 until the head 52 of the main axle 40 comes into contact with the rib 70, whereupon further axial movement of the main axle 40 is prevented. The spacer 44 is then passed over the shaft portion 50 of the main axle 40, with the flange 62 remote from the head 52 of the main axle 40 until the spacer makes contact with an inner surface of the head 52. A first of the bearings 34 is then slid onto the shaft portion 50 of the main axle 40 until its inner race makes contact with the spacer 44. An annular spacing shim 72, the sheave 30, and the second bearing 32 are then placed on the shaft portion, with the spacing shim 72, centred on the median plane $P_m$, maintaining a suitable distance between the inner races of the bearings 32, 34. The rib 38 of the sheave 30 projects within the median plane $P_m$ between the outer races of the bearings 32, 34 to locate the sheave 30 in a correct axial position upon the main axle 40. (In an alternative configuration, the bearings and sheave could be formed as a single unit, thereby avoiding the need for the spacer.)

The polygonal end portion of the main axle 40 is then inserted into the through hole 16 of the first plate 10, and the axle cap 42 is put into place by threading its shaft 58 into engagement with the internal thread of the shaft portion 50 of the main axle 40. The axle cap 42 is tightened using a socket tool 78 that has projecting teeth 80 that engage with the drive slots 66 in the head 60 of the axle cap 42 and a square recess 82 to receive a socket drive tool. (See FIGS. 18 and 19 for an alternative drive arrangement using serrations that could be used in this embodiment.) Tightening of the axle cap 42 connects the plates 10, 12, the sheave and the axle assembly together. The head 60 of the axle cap 42 is received within a recess in the outer surface of the first plate 10.

The path through which forces are transmitted through the components of the pulley block is important. Compressive forces are transmitted from the inner surface of the first plate 10, through the inner races of the bearings 32, 34 and the spacing shim 72 to the spacer 44 and then to the head 52 of the main axle. Tensile forces are transmitted through the shaft 50 of the main axle 40 and the shaft 58 of the cap, these forces being controlled by the degree to which the axle cap is tightened using the tool 78. The dimensions of the spacer 44 and the rib 70 of the second plate 12 are such that the rib 70 is bridged and not clamped between the flange 62 of the spacer 44 and the head 52 of the main axle 40—the spacer 44 carries all of the compressive forces. Instead, there is a small clearance between the rib 70 and the adjacent flange 62 and head 52, which allows the second plate 12 to rotate on the spacer 44 and the main axle 40 about the sheave axis $A_s$ with a minimum of lateral or axial motion.

A recess of circular periphery is formed in each of the plates 10, 12, that of the first plate being shown at 84 in FIGS. 12 and 19. The diameter of the recess 84 is marginally greater than the outer diameter of the sheave 30. Axial end faces of the sheave 30 are received within the recesses to ensure that the sheave 30 does not make contact with the plates 10, 12 and to shield the periphery of the sheave from a rope that is passing through the pulley block, thereby minimising the risk of a rope (or fibres that have frayed from it) or small-diameter cord becoming caught between the sheave 30 and the plates 10, 12 in cases where the rope approaches the sheave from a direction skew to the sheave axis $A_s$. Surrounding the recess, 84, the plates 10, 12 are shaped such that the material of the plates provides a smooth, curved lead-in to the sheave, which serves to minimise friction between the plates and a rope or other line within the pulley block.

It will be seen that the location of the polyhedral portion of the polygonal end portion 54 of the main axle 40 within the hole 16 of the first plate 10 prevents rotation of the main axle with respect to the first plate 10 and also with respect to the axle cap 42, thereby inhibiting accidental loosening of the axle cap 42. Security of the axle cap 42 is further enhanced by use of a thread locking agent and providing a securing mechanism that serves to prevent loosening of the axle cap 42.

The securing mechanism comprises a chock 90 that can be attached by bolts 92 to a recessed part of the first plate 10, such that part of the chock bares forcibly against the head 60 of the axle cap 42 thereby preventing its rotation with respect to the first plate 10, and hence with respect to the main axle 40.

In the embodiment shown in FIG. 11, the chock 90 has planar portion through which two bolt holes pass, the planar portion that has an arcuate locking surface having a radius that corresponds to that of the head 60 of the axle cap 42. The locking surface is tapered at an angle of approximately 10° from a normal to the planar portion. As can be seen from FIGS. 2 and 11, this maximises the contact between the locking surface and the head 60 of the axle cap 42. The chock 90 also has a block that projects from its planar portion to space the planar portion from the surface of the first plate 10. As shown in FIG. 11, in this arrangement, the clamping force $F_1$ of the bolt 92 is reacted by a force $F_r$ applied to the head 60 of the axle cap that has components both normal to and parallel to the axis of the axle assembly.

A variation of the securing mechanism in an alternative embodiment is shown in FIGS. 18 and 19. In this embodiment, the chock 190 tapered on the locking surface and an opposite surface, such that when it is tightened into the recesses part of the plate, it is pushed into contact with the head 60 of the axle cap 42. In this embodiment, a single bolt 192 is used. In this embodiment, the chock 190 will self-centre when the bolt 192 is tightened. In addition, the locking surface of the chock 190 and the head 60 of the axle cap 42 carry serrations to give increased grip between the cap 60 and chock 190—these serrations can also be employed in the embodiment of FIGS. 1 to 17 as an alternative to or an addition to the drive slots 66.

The axle assembly may be disassembled by reversing the above-described assembly procedure. It may subsequently be re-assembled using one or more replacement components, either to replace components that have been subject to wear or damage (most typically, the sheave 30 or the bearings 32, 34, but potentially any other component) or to provide alternative functionality. Components that are not worn beyond their useful service life (for example, the plates 10, 12) can be re-used.

A formation of cylindrical peripheral cross-section projects from each plate 10, 12 in the region of the small boss portion 22, 22', each of which projection constitutes a bollard formation 110, 112 formed integrally with the corresponding plate. The bollard formations 110, 112 are centred on the through-bores at the small boss portion 22, 22' of each plate 10, 12. The through-bores at the small boss portions 22, 22' are internally threaded.

Each bollard formation 110, 112 extends as part of the plate 10, 12 with a first portion that is a cylindrical plinth 120 centred on the bollard axis and has a bore 114, 116 of circular cross-section extending through it. The bollard formations 110, 112, are complementarily shaped such that, with the pulley block in the closed position, they come together to form a bollard of cylindrical cross-section that extends between the plates 10, 12. While the bollard formations can be formed with many specific shapes, those in this embodiment have the additional property of resisting separation of the plates 10, 12 in the event that lateral forces are applied to the plates 10, 12 when the pulley block is in the closed position. Their shape will now be described.

Each bollard formation 110, 112 has an approximately C-shaped interlocking formation 122 that extends from the cylindrical plinth 120. The interlocking formation 122 has a peripheral outer surface, is C-shaped in a plane parallel to the median plane $P_m$ and, centred on the bollard axis $A_b$ and is an extension of the cylindrical plinth 120 in a direction parallel to the bollard axis $A_b$. Thus, a slot 124 is formed between the interlocking formation 122 and the plinth 120. The surface $S_{is}$ of each interlocking formation 122 that defines the slot 124 is coincident with the median plane $P_m$. The surface $S_p$, of the plinth 120 that faces towards the interlocking formation 122 and the surface $S_{ip}$ of the interlocking formation 122 that faces away from the plinth are offset a common angle from the median plane $P_m$.

Figure 3:
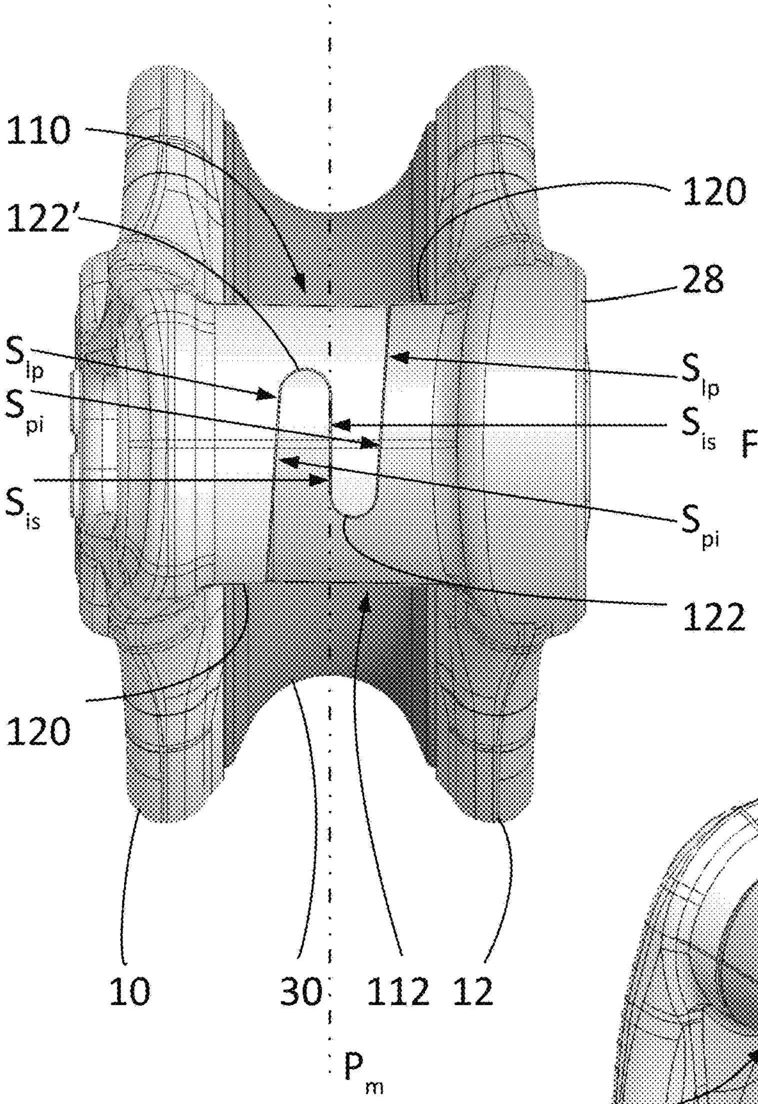
FIG. 3 is a top view of the embodiment of FIG. 1 in the closed condition.
Figure 4:
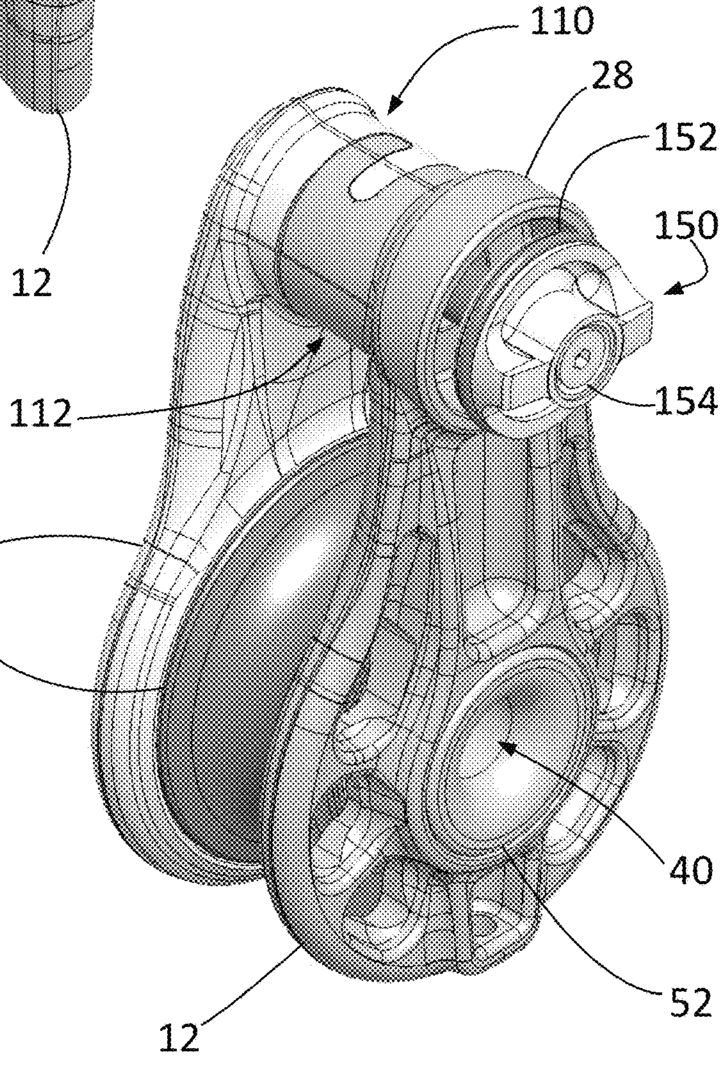
FIG. 4 is an orthographic view corresponding to FIG. 1 in an unlocked condition.
Figure 5:
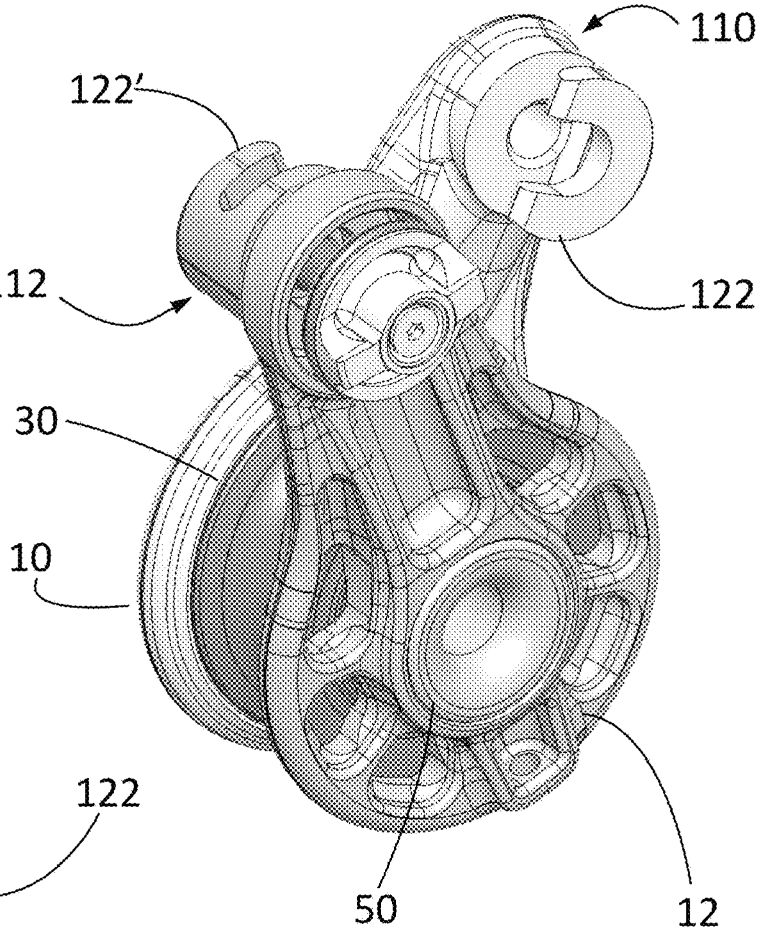
FIG. 5 is an orthographic view corresponding to FIG. 1 in an open condition.
Figure 6:
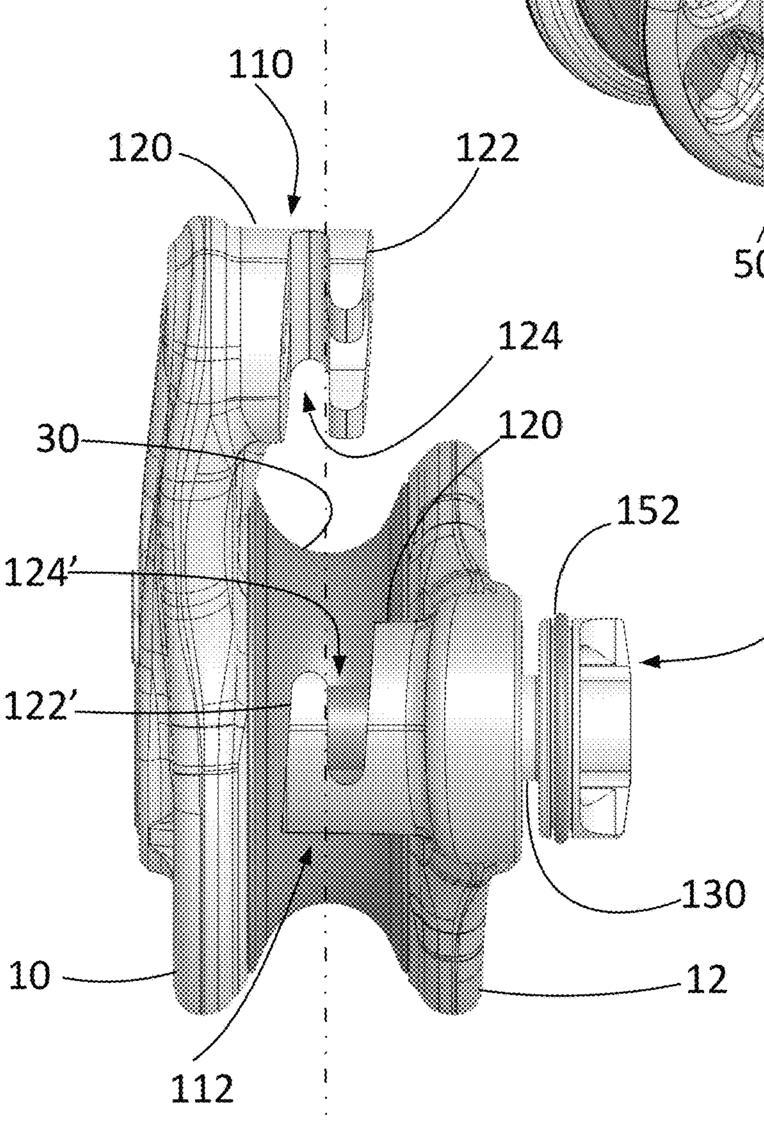
FIG. 6 is a top view of the embodiment of FIG. 1 in the open condition.
Figure 7:
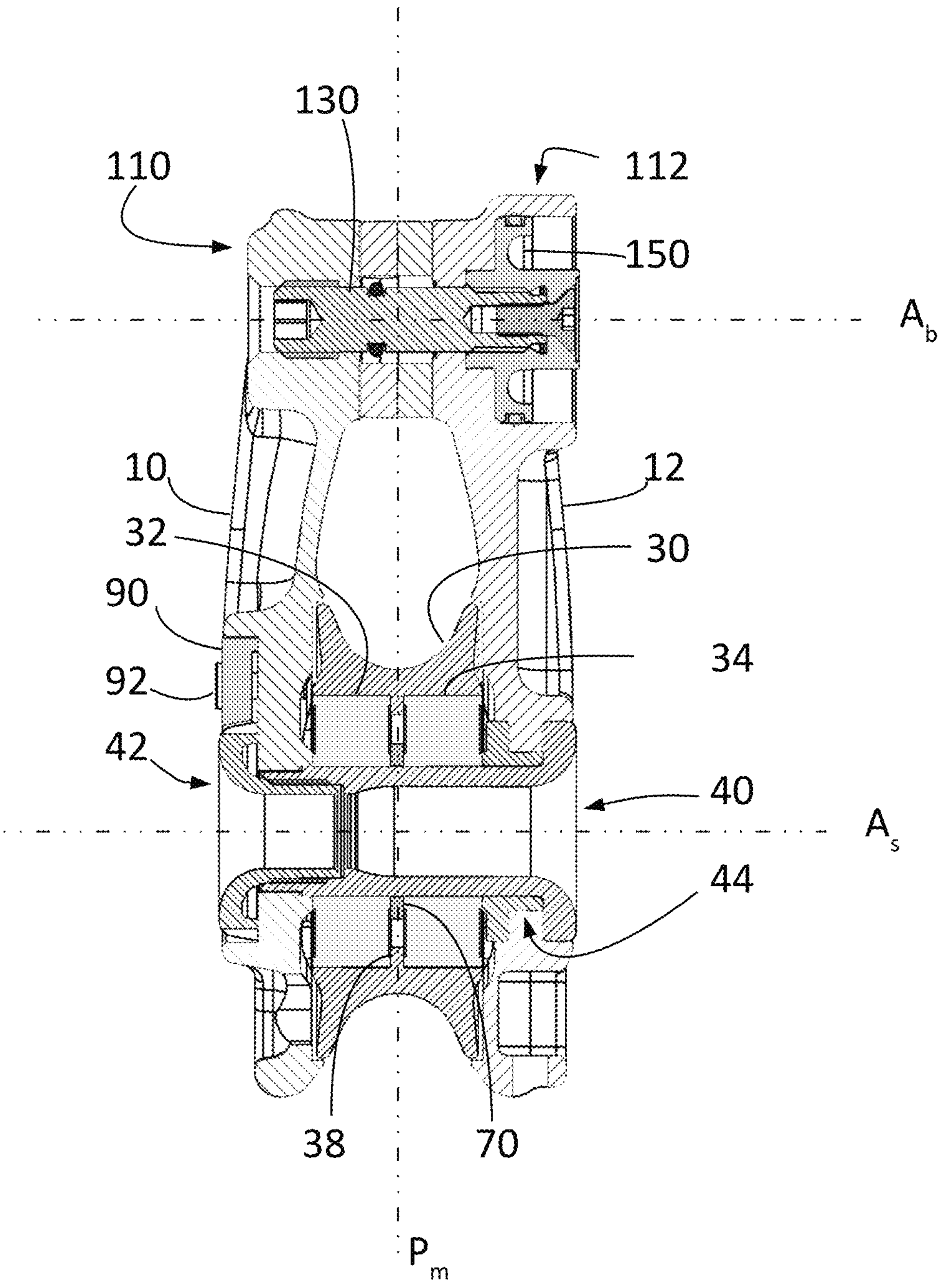
FIG. 7 is a cross-section through the embodiment of FIG. 1.
Figure 8:
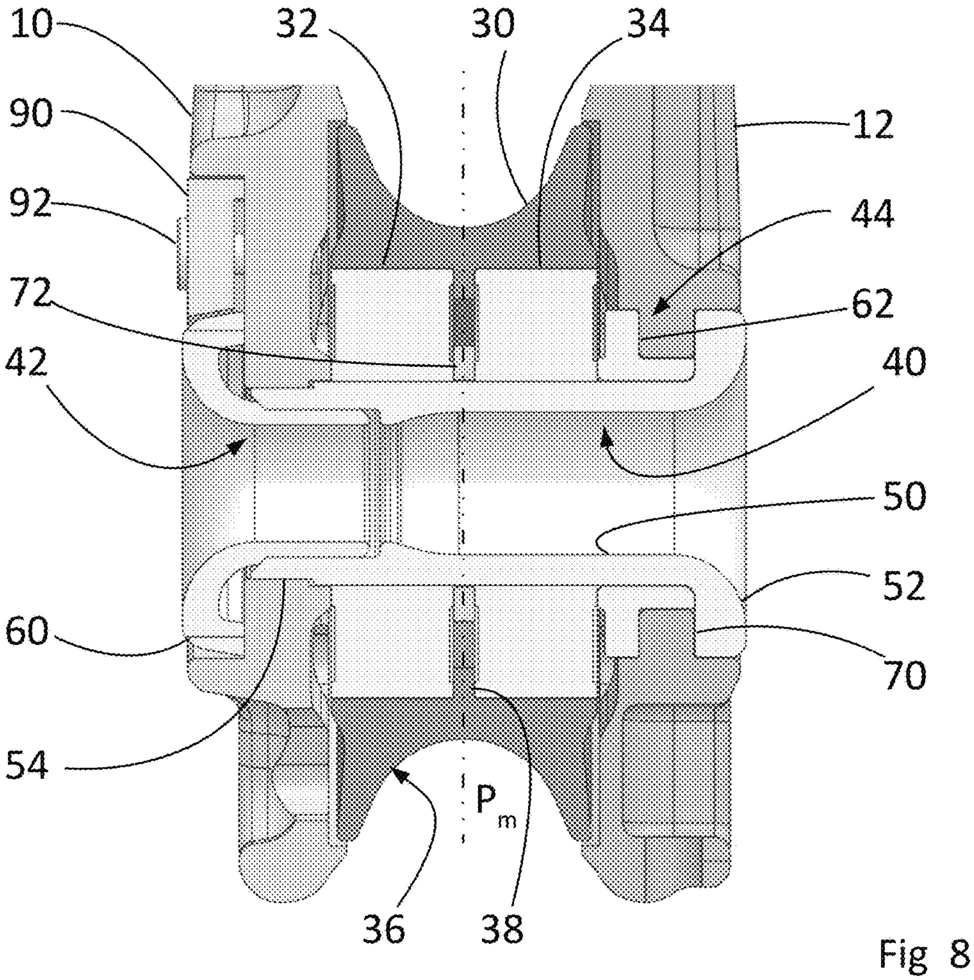
FIG. 8 is a cross-section showing a sheave axle assembly in the embodiment of FIG. 1 in detail.
Figure 9:
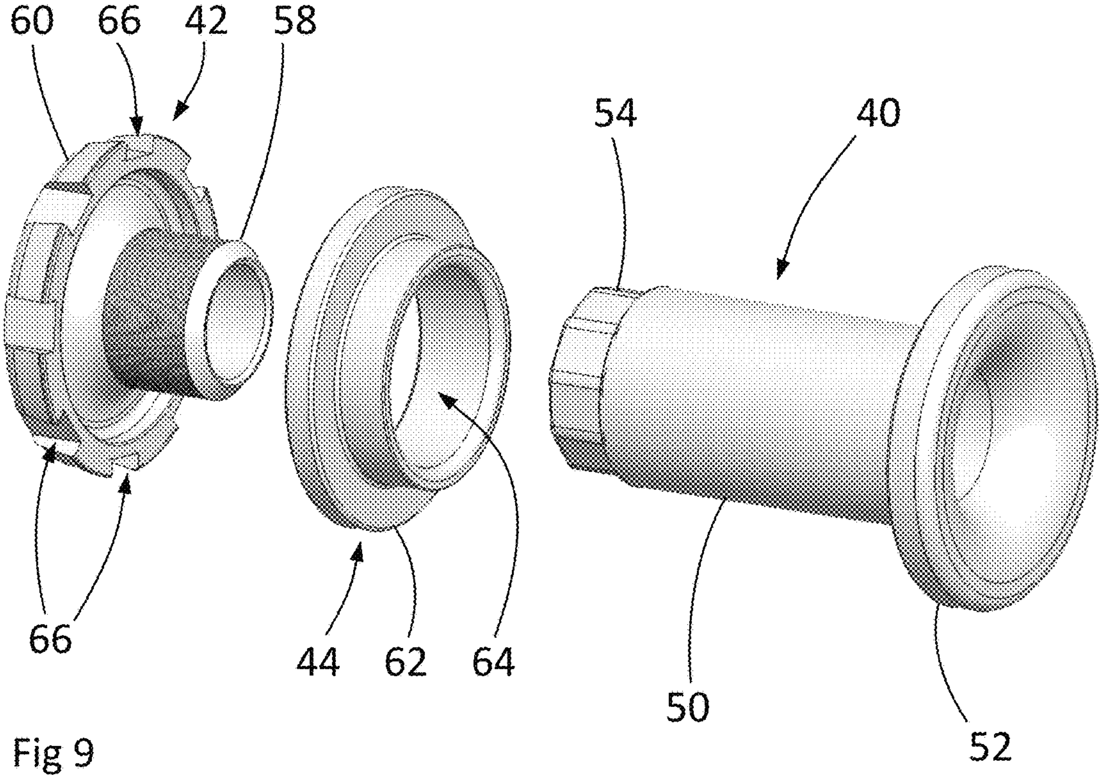
FIG. 9 is an exploded view of the components of the axle assembly of FIG. 9.

The bollard formations 110, 112 and associated formations are shaped and dimensioned such that when the plates 10, 12 are pivoted with respect to another about the sheave axis $A_s$ to bring the pulley block towards the closed position, each interlocking formation 122 enters the slot 124 of the other bollard formation, as shown clearly in FIG. 3. For each bollard formation 110, 112, the surface $S_p$, of each plinth 120 that faces towards the interlocking formation 122 comes into contact with and the surface $S_{ip}$ of the locking formation of the other bollard formation that faces away from the plinth, and the surfaces of the interlocking formations 122 that defines the slots 124 come into contact with one another. Because these surfaces are sloping with respect to the median plane $P_m$, a wedging action is created that urges the surfaces $S_{is}$ of the interlocking formations 122 that define the slot 124 into contact with one another. In addition, the sloping surfaces reduce the need for there to be exact alignment between the surfaces $S_{is}$ and the median plane $P_m$ because the wedging action tends to cause the plates to self-align. Thus, the two bollard formations create a unified, cylindrical bollard extending between the plates 10, 12.

A locking assembly is carried on the second plate 12 that can be used to secure the plates 10, 12 against movement with respect to one another, when the pulley block is in the closed position.

The locking assembly includes a cylindrical locking axle 130. The locking axle has a first end portion 132 that is externally threaded with a thread that is compatible with that of the through-bore at the small boss portion 22 of the first plate 10. A hexagonal hole 134 is formed into the end of the locking axle 130 radially inwardly from the thread of the first end portion 132 to allow the locking axle 130 to be rotated using a suitable tool. Additionally, the locking axle has a second end portion 140 that is externally threaded and a tapped hole 142 is formed into the end of the locking axle 130 radially inwardly from the thread of the second end portion 140. Between the end portions 132, 140, the locking axle 130 is dimensioned to be a close sliding fit in the through bore of the small boss 22' of the second plate 12, and a peripheral groove is formed in the locking axle 130, an O-ring 144 being (in the assembled mechanism) located within the groove.

The locking assembly further includes an axle handle 150. The axle handle 150 has a central threaded bore that is threaded onto the second end portion 140 of the locking axle 130 and is locked in place by a cap screw 152 that is screwed into the tapped hole 142 inwardly of the second end portion 140 of the locking axle 130. The axle handle 150 has a cylindrical peripheral wall centred on the bollard axis $A_b$ that has a peripheral groove in which an O-ring 154 is located. Within the peripheral wall, the axle handle 150 has formations that can be engaged by a user's fingers to turn the axle handle about the bollard axis $A_b$.

To install the locking mechanism, prior to connecting the axle handle 150 to the locking axle 130, the second end portion 140 of the locking axle 130 is passed through the through-bore of the small boss 22' of the second plate 12 from the inner towards the outer surface. The axle handle 150 is then threaded onto the second end portion 140 of the locking axle 130 and secured by addition of the cap screw 152. The O-ring 144 is then passed over the free end of the locking axle and is located in the peripheral groove. The locking axle 130 can then slide axially within the through-bore of the small boss 22' between limits defined by the first end portion 132 of the locking axle 130, which cannot pass through the bore, and the axle handle coming into contact with the second plate 12. When the locking axle 130 is in this position, which is shown in FIG. 15, the pulley block is unlocked, and the plates 10, 12 can be moved between the closed and open positions. It will be seen from FIG. 15 that, in this position of the locking axle, the O-ring 144 is outside of the second plate 12, the O-ring serving to retain the locking axle 132 in that position, which prevents it from clashing with the first plate 10 when the plates 10, 12 are being pivoted between the closed and the open positions.

When the pulley block is closed, and the bores in the small boss portions 22, 22' of the first and second plates 10, 12 are in alignment, the locking axle 130 can be pushed towards the first plate 10. Initially, sliding movement of the locking axle 130 is resisted by the O-ring 144, which has to be compressed in order to pass through the through-bore of the small boss portion 22' of the second plate 12. Once the locking axle 130 comes into contact with the first plate, it can be rotated using the axle handle 150 to cause its first end portion 132 to be drawn by its thread into the through-bore of the small boss portion 22 of the first plate 10, until the locked configuration, as shown in FIG. 14 is reached. In the locked configuration, the axle handle 150 is tight against the second plate 12, and the O-ring 154 in the peripheral wall of the axle handle 150 is in contact with the cylindrical wall 28 of the small boss portion 22' of the second plate 12. Friction between the O-ring 154 and the cylindrical wall resists rotation of the axle handle 150, other than rotation arising as a result of deliberate manual action thereby preventing accidental unlocking.

Alternative configurations of an embodiment of the invention in use are shown in FIGS. 16 and 17. In these figures, stationary lines $L_s$ are shown passing over the bollard and through the axle assembly, and a moving line $L_m$ is shown passing over the sheave 30. (The line $L_s$ that extends through the axle assembly may also move, but will experience additional friction compared with the line $L_m$ passing over the sheave 30.) It will be seen in FIG. 17 that the curved surfaces within the main axle 40 and the axle cap 42 provide a smooth path for the rope passing into and out of the axle assembly. The presence of a line passing over the bollard has the effect of pulling the bollard formations 110, 112 together towards the closed position. The effect of this is to ensure that the pulley block will not open, even if the locking mechanism has been rendered ineffective or has not been activated.

The invention claimed is:

1. A pulley block comprising:

a. first and second plates;

b. a pulley sheave disposed between the plates for rotation on bearings upon a sheave axle assembly that extends between the plates along a sheave axis, c. the plates being connected to the sheave axle assembly so as to permit rotation of one plate with respect to the other about the sheave axis between a closed position of the pulley block and an open position of the pulley block, and d. the sheave axle assembly including a main axle that is fixed for rotation with respect to the first plate and free for rotation with respect to the second plate;

and an axle cap that clamps the main axle to the first plate, the axle cap being removably secured to the main axle wherein:

e. each of the axle cap and the main axle include a shaft portion that extends through a respective through-hole in the first and second plates and each of the axle cap and the main axle include a head portion that is adjacent to a surface of the first and the second plate respectively adjacent to the through-holes; and f. the axle assembly includes a spacer that causes the head portion of the main axle to be spaced from the second plate in a direction parallel to the sheave axis.

2. The pulley block of claim 1, wherein the axle cap is in threaded engagement with the main axle.

3. The pulley block of claim 1, further including a securing mechanism that prevents rotation of the axle cap with respect to the first plate.

4. The pulley block of claim 3, wherein the securing mechanism is removable to allow the axle cap to be disconnected from the main axle to enable dismantling of the axle assembly.

5. The pulley block of claim 4, wherein the securing mechanism includes a chock that can be attached to the first plate such that part of the chock bares forcibly against the head portion of the axle cap thereby preventing its rotation with respect to the first plate.

6. The pulley block of claim 5, wherein the chock can be attached within a recessed part of the first plate.

7. The pulley block of claim 6, wherein the chock has a tapered locking surface which makes contact with the head of the axle cap.

8. The pulley block of claim 1, wherein the axle assembly is hollow to provide a passage through the pulley block in a direction parallel to the sheave axis.

9. The pulley block of claim 8, wherein end portions of the passage are convex in section.

10. The pulley block of claim 1, wherein the main axle has an end portion opposite the head which is received in the through-hole in the first plate and is thereby constrained against rotation with respect to the first plate.

11. The pulley block of claim 10, wherein the end portion of the main axle is polygonal in shape.

12. The pulley block of claim 1, wherein each plate has, at a position remote from the sheave axis, a respective bollard formation, which bollard formations are disposed such that, when the plates are in the closed position, the respective bollard formations are in contact with or in close proximity to one another to form a bollard that extends between the plates, and when the plates are in the open position, the respective bollard formations are spaced apart.

13. The pulley block of claim 12, wherein each bollard formation is formed integrally with a respective plate as a one-piece cast and/or forged component.

14. The pulley block of claim 12, wherein a respective bore extends through each of the bollard formations, the bores being aligned with one another on a bollard axis when the pulley block is in the closed position.

15. The pulley block of claim 14, further comprising a locking component, the pulley block and the locking component being configured so that insertion of the locking component into the bores maintains the bores in alignment with one another, thereby holding the plates in the closed position.

16. The pulley block of claim 12, wherein the bollard formations are shaped such that, in the closed position, part of one bollard formation overlaps and is in contact with part of the other bollard formation in a direction that has a component parallel to the bollard axis.

17. The pulley block of claim 16, wherein the overlapping parts of the bollard formations have surfaces in contact with one another that are normal to the bollard axis.

18. The pulley block of claim 12, wherein in the closed position, the bollard formations together form a bollard that is convex in section in a direction facing towards the sheave.

19. The pulley block of claim 18, wherein in the closed position, the bollard formations together form a bollard that is circular in section.

20. The pulley block of claim 1, wherein each plate has a recess within which a portion of the sheave extends.

21. The pulley block of claim 20, wherein the recess is circular and centred on the sheave axis.

22. The pulley block of claim 1, having two or more sheaves disposed between the plates.

23. The pulley block of claim 1, having three or more plates.

24. The pulley block of claim 1, wherein one or more sheave is free for rotation in either direction.

25. The pulley block of claim 1, wherein one or more sheave, is restricted to rotation in a single direction.

* * * * *